UNITED STATES PATENT OFFICE.

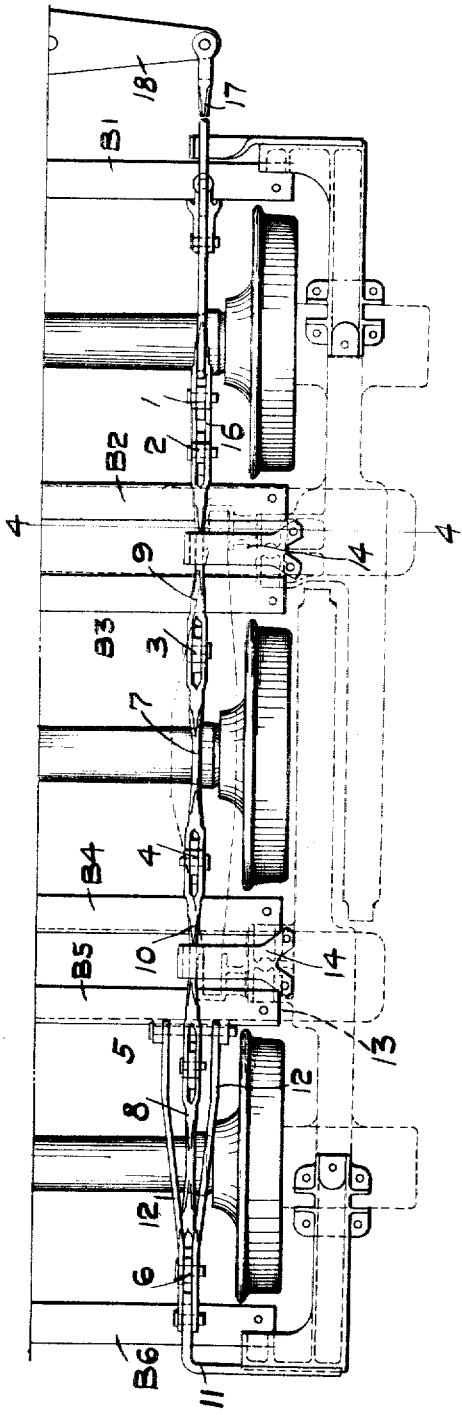
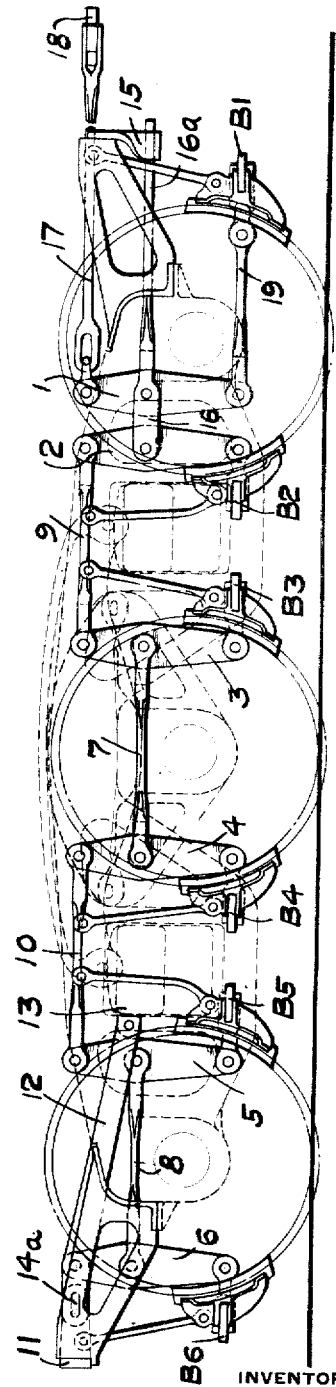

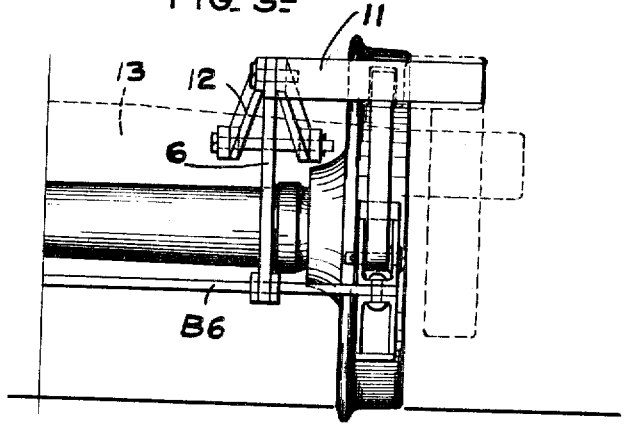
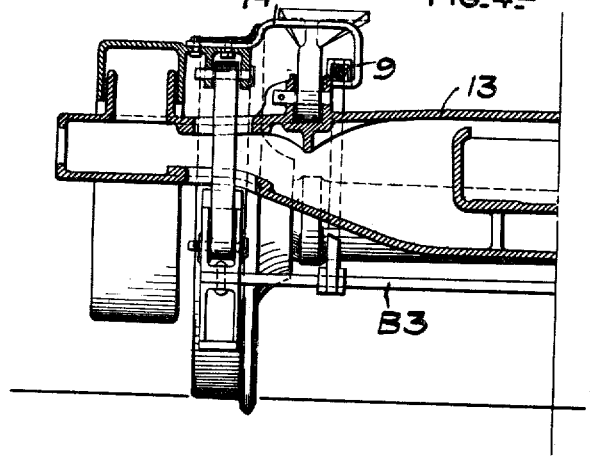
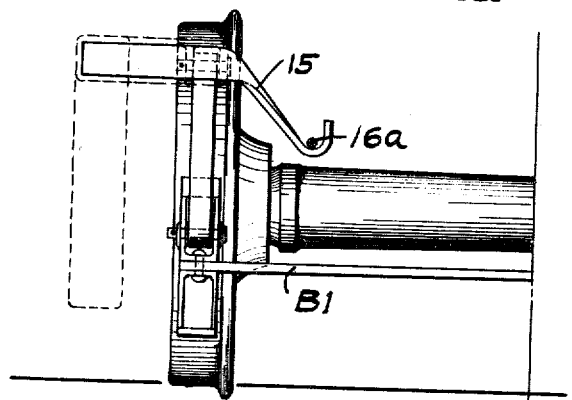

THOMAS L. BURTON AND HENRY A. WAHLERT, OF ST. LOUIS, MISSOURI, ASSIGNORS TO THE AMERICAN BRAKE COMPANY, OF ST. LOUIS, MISSOURI, A CORPORATION OF MISSOURI.

BRAKE-RIGGING FOR ARTICULATED TRUCKS.

1,271,538.     Specification of Letters Patent.     Patented July 9, 1918.

Application filed November 15, 1916. Serial No. 131,359.

*To all whom it may concern:*

Be it known that we, THOMAS L. BURTON and HENRY A. WAHLERT, both citizens of the United States, and residents of St. Louis, in the State of Missouri, have invented a certain new and useful Improvement in Brake-Rigging for Articulated Trucks, of which improvement the following is a specification.

This invention relates to foundation brake rigging for railway trucks, and more particularly to what are known as articulated trucks in which the members are more or less flexibly connected together in order to eliminate rigidity and allow the truck to accommodate itself to changes or irregularities in the surface or alinement of the track.

The principal object of our invention is to provide between the flexible members of the truck, means for resisting and transmitting stresses from the brake lever fulcrums without in any way preventing the free articulated movement of the various truck members, or to subject any truck member to stresses from the brake rigging tending to rupture said members or induce a displacement or heating of the journals during such times as the brakes are applied. Another object is to provide improved means for supporting and guiding the levers and rods of the brake rigging.

In the accompanying drawings: Figure 1 is a side elevation of the foundation brake design applied to a six wheeled truck and embodying our improvement; Fig. 2, a half plan of the same; Fig. 3, an end elevation; Fig. 4, a transverse section taken on the line 4—4 of Fig. 2; and Fig. 5, an end elevation at the opposite end of the truck.

We have shown our improvement applied in connection with a clasp type of brake rigging for six wheeled trucks and having two sets of brake rods and truck levers, one set at each side of the longitudinal center line of the truck. This construction comprises the brake beams, B¹, B², B³, B⁴, B⁵ and B⁶, connected to the respective brake shoes, and having pivotal connections with the respective truck levers, 1, 2, 3, 4, 5 and 6, the brake beams and shoes being thus applied to both sides of each pair of wheels. The truck levers of the respective pairs are connected together by the tie rods 16, 7 and 8, while the adjacent truck levers, 2 and 3, are connected at their upper ends by pull rods, 9, and levers, 4 and 5, by pull rods, 10. This makes a tandem arrangement in which all the truck levers are live levers except the last truck levers, which are dead levers, having substantially fixed fulcrums.

In the construction of articulated truck frames, rigid transverse frame members are eliminated, and consequently it is necessary to provide a bracket member, 11, at the end of the truck frame and extending around the end wheel for supporting the fulcrum of the dead lever, 6. In order to prevent any tendency to twist or displace any of the parts of the truck frame due to the reaction from the braking stresses, means are provided, such as the strut or brace, 12, for transmitting these reaction stresses in the plane of the brake lever system to the transverse truck bolster or transom, 13, and thereby relieve the bracket and end member of the truck frame from bending strains during brake applications.

As shown in the drawings, the strut, 12, is in the form of a fulcrum bar which is bifurcated, with one arm on each side of the truck lever, 6, and pivotally connected at one end to the bracket, 11, and at the other end to the bolster, 13, thereby allowing for the free vertical movement of the bolster between its guides. The pivot at one end, such as the bracket, is also provided with a slot, 14ª, to allow for a limited longitudinal movement of the fulcrum bar during the swinging or spring movement of the parts of the articulated frame, and the dead truck lever, 6, is pivotally supported on the bar, 12, at its fulcrum.

According to another feature of our construction, the pull rods, 9 and 10, are supported and guided by means of brackets, 14, mounted on a member of the truck frame between adjacent wheels and extending inward toward the center line and into the plane of the truck lever system, at which point the bracket, 14, is bent around the pull rod, as shown in Fig. 4.

The live truck lever, 1, for the first pair of wheels at the inside end of the truck, is preferably located on the same side of the axle as the lever, 2, the coupling rod or bar, 16, between these levers being very short and provided with an extension, 16ª, projecting forward through a guide bracket, 15, mounted on the end of the truck frame. This location of the lever, 1, necessitates the use of the rod, 19, pivotally connected to the bottom of the lever, and to the brake beam, B¹. The upper end of the truck levers, 1, are connected by pull rods, 17, with the cross equalizer, 18, which may be actuated by the brake cylinder pressure through a suitable pull rod connection, as will be readily understood. By means of this arrangement, the connection to the truck levers is brought nearer to the center of the truck, which is an advantage, and the truck lever system will be properly supported and guided.

It will now be seen that we have provided a brake rigging for articulated trucks, which furnishes substantially a fixed fulcrum for the dead truck lever, while it also allows the truck members to perform all of their functions without interference or distortion due to the braking stresses, since it comprises a floating arrangement of fulcrum bar that brings the direct stresses in brake applications upon the bolster or transom into a direct line with the force acting through the brake levers.

Having now described our invention, what we claim as new and desire to secure by Letters Patent is:

1. In a brake rigging for railway trucks, the combination of a dead truck lever having a fulcrum, a bracket for supporting the same and a strut pivotally connected to said bracket and extending to a transverse truck member for transmitting the reaction from said fulcrum to the truck frame.

2. In a brake rigging for railway trucks, the combination of a dead truck lever located at the inside of the wheels, a bracket attached to the truck frame outside of the truck wheels and extending to the plane of the truck lever for supporting the same, and a strut connecting said bracket with a transverse truck member at the opposite side of the axle.

3. In a brake rigging for railway trucks, the combination of two sets of truck levers, one at each side and inside of the truck wheels, brackets attached to the truck frame outside of the wheels for supporting the fulcrums of the dead truck levers, and bifurcated struts connecting said brackets with a transverse truck bolster.

4. In a brake rigging for railway trucks, the combination of a dead truck lever located at the inside of the wheels, a bracket attached to the truck frame outside of the truck wheels ánd extending to the plane of the truck lever for supporting the same, and a fulcrum bar pivotally attached to said bracket and to a transverse truck member at the opposite side of the axle, the dead lever being fulcrumed on said bar.

5. In a brake rigging for railway trucks, the combination of two sets of truck levers, one at each side and inside of the truck wheels, pull rods connecting the upper ends of adjacent truck levers, and brackets attached to the truck frame outside of the wheels for supporting and guiding said pull rods.

6. In a brake rigging for railway trucks, the combination of brake beams applied to both sides of each pair of wheels, a truck lever for each beam, the two truck levers for the first pair of wheels being located at the inner side of the axle, a coupling rod pivotally connected to the said two truck levers, and having an extension at the other side of the axle, and a bracket attached to the truck frame for supporting and guiding said extension.

7. In a brake arrangement for car trucks, a plurality of brake beams, a plurality of brake levers therefor, and a plurality of lever actuating members, one of said levers being pivoted to a relatively fixed portion of the truck, the pivot point therefor embodying a load receiving strut extending between the said lever and a fixed portion of the truck and adapted to receive the brake lever reaction load and a lever-spacing bracket secured to a relatively fixed portion of the truck and extending therefrom to the pivot end of the said strut, said bracket being adapted to support the said lever and strut and being formed in such manner as to prevent the delivery thereto of brake lever reaction loads.

8. In a brake arrangement for car trucks, a pair of brake levers, a pair of brake beams one of which is attached to the corresponding extremities of each of said levers, a lever-connecting member extending between the two levers and attached thereto between their extremities, a lever-actuating member attached to the other extremity of one of said levers, the corresponding extremity of the second lever being pivoted at a dead point, a truck bolster, a strut extending from said bolster to the dead point of the said lever and forming the dead pivot point therefor, said strut passing adjacent the first of said levers but out of the path thereof and said strut being adapted to receive the brake reaction load and transmit the same to the said bolster.

9. In car truck brakes, a dead and a live brake lever disposed one ahead of the other and lying in substantially a common plane, means for actuating the said live lever, means extending therefrom for actuating the said dead lever, and a fulcrum for said dead lever extending to a relatively-fixed portion of the truck, said fulcrum passing by the said live lever but out of the plane of travel thereof.

In testimony whereof we have hereunto set our hands.

THOMAS L. BURTON.
HENRY A. WAHLERT.